United States Patent Office 2,964,111
Patented Dec. 13, 1960

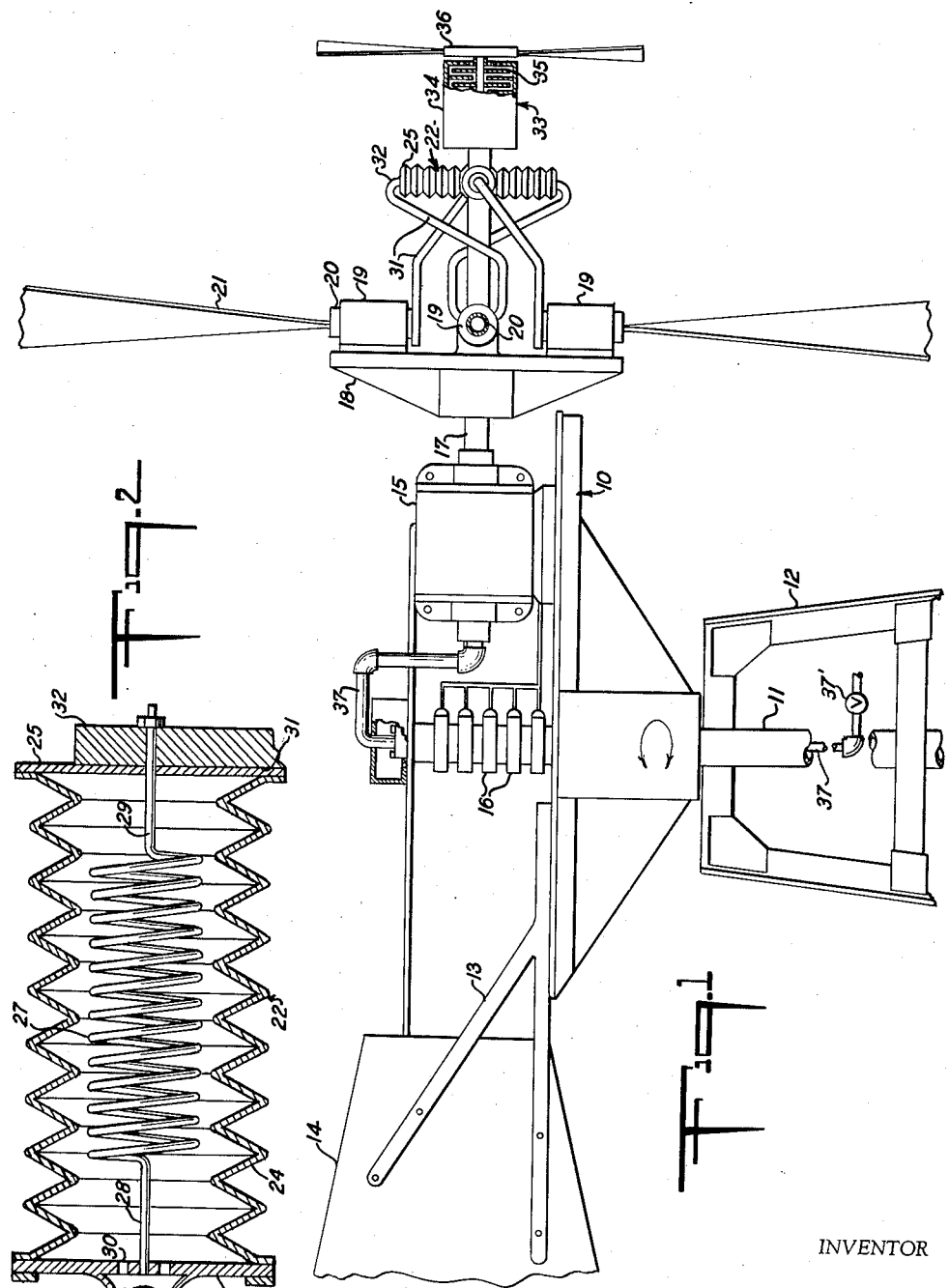

2,964,111

WIND TURBINE PRIME MOVER AND GOVERNOR

John U. Morris, R.D. 6, Oswego, N.Y.

Filed July 17, 1956, Ser. No. 598,399

2 Claims. (Cl. 170—62)

This invention relates to power plants and more particularly to such a plant utilizing wind power and incorporating a wind turbine prime mover and a governor.

For many years, attempts have been made to harness wind power, but these have only been successful in relatively small installations, such as those often found on farms for pumping water and also for relatively small generators for charging storage batteries and for otherwise providing relatively small amounts of power. Attempts have also been made to design and operate relatively large commercial wind power installations, but as yet, these have not proved practical, which is due in a large part to the relatively great variation in wind velocity in most locations and the necessity for designing the apparatus to withstand relatively high maximum wind velocities, even though such velocities may only occur a relatively few times each year.

It has been found that the power available from the wind varies as the cube of the wind velocity and where installations have been designed to absorb the maximum power at maximum wind velocities found in that particular location, the cost of such installation has been prohibitive from that standpoint. On the other hand, where installations have been designed to utilize the power available from low velocity winds, the efficiency of the installation has not been sufficiently high to warrant the cost thereof.

In utilizing wind turbines to drive alternating current generators, an added difficulty has been introduced in the control of such turbines, in that means must be provided to bring the turbine to a synchronous speed and maintain such speed until the generator is phased to the line and thereafter some means must be provided to maintain the power output of the prime mover substantially constant, regardless of changes in wind velocity.

It has been found that it is entirely practical to design a power plant installation utilizing a wind turbine as a prime mover, in which the installation is designed for maximum efficiency and power output at the average wind velocity in that particular locality and that as the wind velocity increases above the average for which the installation is designed, the governor operates to maintain the power output substantially constant, as determined by the average wind velocity and the power available from an increase in wind velocity is not utilized, which results in materially reducing the cost of constructing the installation.

It is accordingly an object of the invention to provide a power plant incorporating a wind turbine prime mover and governor in which a substantially constant speed and power output is maintained, regardless of changes in wind velocity.

A further object of the invention is the provision of a wind turbine prime mover and governor in which the pitch of the propeller blades utilized in the turbine may be varied as a result of changes in wind velocity.

Another object of the invention is the provision of a wind turbine prime mover and governor in which any desired number of blades may be utilized in the wind turbine and the pitch of such blades controlled by the governor in response to changes in wind velocity.

A further object of the invention is the provision of a wind turbine prime mover and governor which may be conveniently designed for maximum efficiency at an average wind velocity for the locality selected and in which means is provided for maintaining the speed and power output of the turbine substantially constant, regardless of changes in wind velocity.

A still further object of the invention is the provision of a wind turbine prime mover and governor which may be utilized to drive an alternating current generator and in which automatic control means may be provided to bring the turbine to a synchronous speed and thereafter phase the generator to the line.

Another object of the invention is the provision of a wind turbine prime mover and governor which may be conveniently and economically constructed from readily available material and which will provide a highly efficient power plant, the initial cost of which is sufficiently low to provide a practical commercial wind power installation.

Further objects and advantages of the invention will be apparent from the following description taken in conjunction with the accompanying drawings wherein:

Fig. 1 is a side elevational view with parts in section and broken away for greater clarity of a power plant constructed in accordance with this invention and utilizing a wind turbine provided with four blades, together with governing means therefor;

Fig. 2 a longitudinal sectional view of a bellows unit utilized in the governor for controlling the wind turbine prime mover of this invention.

With continued reference to the drawings and particularly Fig. 1, there is shown a wind turbine prime mover and governor constructed in accordance with this invention and which may well comprise a base or platform 10 mounted for rotation about a vertical axis on a shaft or other suitable support 11 carried by a tower or other suitable structure 12. Mounted on the base or platform 10 at one side thereof, by suitable brackets 13 is a wind vane 14 and on the opposite side of the platform 10 there may be mounted a suitable electric generator 15 which may be of either the alternating current or direct current type, but in the present case, there is shown an alternating current generator. The upper end of the shaft 11 is shown as provided with slip rings 16, there being five in number shown and two of these slip rings serve to provide field excitation power for the generator 15 and the other three slip rings serve to convey the power output of the generator 15 to the power house located adjacent the tower 12.

The generator 15 is provided with a hollow main shaft 17 projecting therefrom in a direction opposite to the wind vane 14 and fixed on the hollow shaft 17 intermediate the length thereof for rotation therewith, is a spider 18. A plurality of propeller blade mounting brackets 19 are secured to the spider 18 and each bracket 19 serves to rotatably mount a stub shaft 20 for rotation about a radial axis. Each stub shaft 20 serves as a mounting means for the inner end of a propeller blade 21, there being four such blades employed in the structure shown in Fig. 1, and while a more or less conventional showing of such blades has been made, it is understood that they will be formed of suitable airfoil configuration to provide maximum efficiency at the particular wind velocities for which the apparatus is designed. It is also intended that each blade be balanced along the longitudinal axis. Obviously, rotation of the stub shafts 20 about radial axes will serve to rotate the propeller blades 21 to change the pitch thereof and the mechanism for accomplishing this pitch-changing function will now be described.

Outwardly of the spider 18 there is mounted on the hollow shaft 17 a plurality of bellows units 22 and there is one such unit for each propeller blade 21. Each bellows unit 22 communicates with the interior of hollow shaft 17 for a purpose to be presently described, and with particular reference to Fig. 4, each bellows unit 22 may well comprise a base plate 23 to which a bellows 24 formed of reinforced rubber or suitable air impervious fabric is attached, the bellows 24 being secured at the opposite end thereof to a closure plate 25. Within the bellows 24 is a tension spring 27 which is secured at one end 28 to the base plate 23 and at the opposite end 29 to the closure plate 25. Also provided in the base plate 23 are apertures 30 which communicate with the interior of hollow shaft 17. The tension spring 27 serves to bias the bellows 24 toward contracted position.

Secured to each stub shaft 20 is a lever arm 31 and such lever arm is secured at its other end 32 to the closure plate 25 of the associated bellows unit 22. Where four propeller blades are provided, as in Fig. 1, there will be four bellows units 22 and four lever arms 31 and it will, therefore, be seen that expansion and contraction of one of the bellows units 22 will result in changing the pitch of the particular propeller blade 21 to which that bellows unit is connected through the lever arm 31.

Mounted on the outer end of the hollow shaft 17 is a rotary air compressor 33 and this compressor may well comprise a stator 34 fixed to the hollow shaft 17 for rotation therewith and a rotor 35 mounted for rotation within the stator 34 and in order to drive the rotor 35, there is provided a propeller 36 connected thereto and so designed as to drive the rotor 35 in a direction opposite to the direction of rotation of the stator 34. By rotating the rotor 35 in a direction opposite to that of the stator 34, a greater relative speed is obtained and consequently, the compressor 33 will develop a higher air pressure for a given wind velocity. It is further to be noted, that the diameter of the propeller 36 is equal to or less than the inner effective diameter of the propeller blades 21 forming the prime mover of the power plant of this invention. In this way, the propeller 36 does not adversely interfere with air flow to the blades 21 of the prime mover.

The discharge outlet of the compressor 33 communicates with the interior of the hollow shaft 17 and through such shaft with the bellows units 22, the air pressure from the compressor 33 tending to expand the bellows units 22 against the action of the tension springs 27. In order to control the air pressure in the bellows units 22, there may be provided a bleeder pipe 37 connected to the hollow shaft 17 through a suitable rotary joint, not shown, and the bleed pipe 37 may lead downwardly through the vertical shaft 11 to a suitable control valve 37' which may be either manually operated or may be entirely automatic in operation and obviously, operation of such control valve will serve to bleed air from the bellows units 22 and thereby control the effective pressure.

In operating the power plant, as described above, it is assumed that the wind velocity is sufficient to rotate the hollow shaft 17 at or above the synchronous speed necessary for phasing the alternating current generator 15 to the line and in the event the wind velocity is such as to rotate the hollow shaft 17 above the synchronous speed necessary for phasing the alternating current generator 15 to the line, the control valve 37' may be operated either manually or automatically to adjust the speed of the shaft 17 to that necessary for phasing the generator to the line.

Obviously, if the wind velocity increases the power absorbed by the generator 15 will increase and if this power output were not controlled, the generator would exceed its power capabilities and eventually burn out. For this purpose, the rotary air compressor 33 operates to maintain the power output of the prime mover substantially constant, regardless of changes in wind velocity and as will be seen, if the wind velocity increases, the air pressure delivered by the compressor 33 will also increase and since, such air pressure is introduced into the bellows units 22, this will result in expanding such units against the action of tension springs 27 even though the speed of rotation of the shaft 17 has not increased and such expansion of the bellows units 22 will result in increasing the pitch of the blades 21, which will spill air therefrom and prevent an increase in power output, even though the wind velocity has increased. In this manner, the power output of the prime move is held substantially constant, regardless of increases in wind velocity and, of course, when the wind velocity falls below a predetermined amount, the power output will be insufficient to drive the generator 15 and the same will then be disconnected from the line. Also, by means of the bleed pipe 37 and the control valve, mentioned above, the air pressure in the bellows units 22 may be controlled in order to maintain the power output within the desired limits and this control may also be utilized for obtaining variations in speed during the synchronizing operation.

It will thus be seen that by the above described invention there has been provided a power plant utilizing wind power, in which the power output of the wind turbine may be automatically controlled in accordance with changes in wind velocity and which, therefore, eliminates the necessity for designing equipment to withstand maximum wind velocities encountered at any particular location. As a result, the apparatus may be designed for maximum efficiency at an average wind velocity found at a particular location, as a result of which the initial cost of installation and construction may be held to a minimum, thereby permitting a practical commercial installation.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A wind turbine prime mover and governor comprising a hollow shaft rotatably mounted on a substantially horizontal axis, a spider fixed to said shaft intermediate the length thereof, a plurality of propeller blade mounting brackets secured to said spider, a stub shaft mounted in each bracket for rotation about a radial axis, a propeller blade fixed to each stub shaft and carried thereby for rotation about the longitudinal axis of the blade with said blades rotating as a unit with said spider and hollow shaft, a plurality of bellows units mounted on said hollow shaft for expansion and contraction in a radial direction, there being one bellows unit for each propeller blade, each bellows unit communicating with the interior of said hollow shaft, a tension spring in each bellows unit for biasing the same toward contracted position, a lever arm connecting the outer end of each bellows unit and the associated stub shaft, whereby upon movement of said lever arms said stub shafts will be rotated to rotate said propeller blades about their longitudinal axes to vary the pitch thereof, a rotary air compressor comprising a stator mounted on said hollow shaft for rotation therewith, a rotor rotatably mounted in said stator and a propeller fixed to said rotor for driving the same in a direction opposite to the direction of rotation of said stator and hollow shaft, the outer diameter of said last mentioned propeller being equal to or less than the inner effective diameter of said first mentioned propeller blades, the discharge outlet of said compressor communicating with the interior of said hollow shaft and control means for bleeding air from said hollow shaft to control the air pressure in said bellows units and thereby control the pitch of said first mentioned propeller blades and whereby with said control means inoperative the air pressure in said bellows units will vary in accordance with the changes in the speed of rotation of said rotor as the result of changes in wind velocity to expand or contract said bellows and vary the pitch of said first mentioned propeller blades.

2. A wind turbine prime mover and governor comprising a main shaft rotatably mounted on a substantially horizontal axis, a spider fixed to said shaft, a plurality of propeller blade mounting brackets secured to said spider, a stub shaft mounted in each bracket for rotation about a radial axis, a propeller blade fixed to each stub shaft and carried thereby for rotation about the longitudinal axis of the blade with said blades rotating as a unit with said spider and main shaft, a plurality of bellows units mounted on said main shaft for expansion and contraction in a radial direction, means for biasing each bellows unit toward contracted position, means connecting said bellows units and said stub shafts, whereby upon movement of said last named means said stub shafts will be rotated to rotate said propeller blades about their longitudinal axes to vary the pitch thereof, an air compressor mounted on said main shaft, a propeller for driving said compressor, the discharge outlet of said compressor communicating with each bellows unit and control means to control the air pressure in said bellows units and thereby control the pitch of said first mentioned propeller blades and whereby with said control means inoperative the air pressure in said bellows units will vary in accordance with changes in the speed of operation of said compressor as the result of changes in wind velocity to expand or contract said bellows and vary the pitch of said first mentioned propeller blades.

References Cited in the file of this patent

UNITED STATES PATENTS

| | | |
|---|---|---|
| 45,530 | Smith | Dec. 20, 1864 |
| 188,236 | Dana | Mar. 13, 1877 |
| 1,183,219 | Manikowske | May 16, 1916 |
| 1,274,545 | Herwehe | Aug. 6, 1918 |
| 1,720,402 | Rokita | July 9, 1929 |
| 1,746,991 | Bucklen | Feb. 11, 1930 |
| 2,148,843 | Stephens | Feb. 28, 1939 |
| 2,416,516 | Everts | Feb. 25, 1947 |
| 2,653,250 | Romani | Sept. 22, 1953 |